(12) United States Patent
Zhao et al.

(10) Patent No.: US 11,790,483 B2
(45) Date of Patent: Oct. 17, 2023

(54) METHOD, APPARATUS, AND DEVICE FOR IDENTIFYING HUMAN BODY AND COMPUTER READABLE STORAGE MEDIUM

(71) Applicant: BAIDU ONLINE NETWORK TECHNOLOGY (BEIJING) CO., LTD., Beijing (CN)

(72) Inventors: Chen Zhao, Beijing (CN); Shaoxiong Yang, Beijing (CN); Xiaoyin Zhang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 9 days.

(21) Appl. No.: 16/562,569

(22) Filed: Sep. 6, 2019

(65) Prior Publication Data
US 2020/0134305 A1   Apr. 30, 2020

(30) Foreign Application Priority Data
Oct. 24, 2018   (CN) .......................... 201811245356.6

(51) Int. Cl.
*G06T 7/70* (2017.01)
*G06T 3/40* (2006.01)
(Continued)

(52) U.S. Cl.
CPC .................. *G06T 3/40* (2013.01); *G06T 7/70* (2017.01); *G06V 10/7553* (2022.01);
(Continued)

(58) Field of Classification Search
CPC .... G06K 9/00369; G06K 9/4609; G06K 9/54; G06K 2009/3291; G06K 9/6209;
(Continued)

(56) References Cited

U.S. PATENT DOCUMENTS 8,026,945 B2 * 9/2011 Garoutte .......... G08B 13/19643
348/143
10,692,472 B2 * 6/2020 Chae ..................... G06F 1/3206
(Continued)

FOREIGN PATENT DOCUMENTS

CN   104346802 A   2/2015
CN   106650682 A   5/2017
(Continued)

OTHER PUBLICATIONS

First Office Action in CN Patent Application No. 201811245356.6 dated Aug. 4, 2020.
(Continued)

*Primary Examiner* — John Villecco
*Assistant Examiner* — Han Hoang
(74) *Attorney, Agent, or Firm* — DILWORTH IP, LLC (57) ABSTRACT

Provided are a method, an apparatus, and a device for identifying human body, including: acquiring a first original picture captured; adjusting a resolution according to the acquired picture to obtain a target picture; processing the target picture based on a preset model for human body feature point detection to determine whether the target picture includes human body information; if the target picture includes the human body information, determining human body area information in the original picture according to the human body information and inputting the human body area information into a filter, enabling that the filter determines target human body area information according to the human body area information; acquiring a next original picture captured; and determining a possible human body area in the next original picture according to the target human body area information, and performing the step of adjusting the resolution according to the possible human body area.

18 Claims, 4 Drawing Sheets

(51) Int. Cl.
*G06V 40/10* (2022.01)
*G06V 10/75* (2022.01)
*G06V 10/62* (2022.01)

(52) U.S. Cl.
CPC .. *G06V 40/103* (2022.01); *G06T 2207/30196* (2013.01); *G06V 10/62* (2022.01)

(58) Field of Classification Search
CPC ........ G06K 9/00362; G06K 9/46; G06T 7/70; G06T 3/40; G06T 2207/30196; G06T 2207/10016; G06T 7/73; G06T 7/277; G06T 3/4092
See application file for complete search history.

(56) References Cited

U.S. PATENT DOCUMENTS

| | | | |
|---|---|---|---|
| 2002/0167537 A1* | 11/2002 | Trajkovic | G06K 9/32 345/649 |
| 2007/0086669 A1* | 4/2007 | Berger | G06V 10/235 382/243 |
| 2010/0158387 A1 | 6/2010 | Choi et al. | |
| 2012/0062732 A1* | 3/2012 | Marman | G08B 13/19682 348/142 |
| 2016/0286138 A1 | 9/2016 | Kim | |
| 2017/0076148 A1* | 3/2017 | Sashida | G06K 9/00248 |
| 2018/0247132 A1* | 8/2018 | Liu | G06T 11/60 |
| 2020/0285845 A1* | 9/2020 | Oami | G06K 9/00771 |

FOREIGN PATENT DOCUMENTS

| | | |
|---|---|---|
| CN | 108537204 A | 9/2018 |
| JP | 2005100084 A | 4/2005 |
| JP | 2006202184 A | 8/2006 |
| JP | 2008250444 A | 10/2008 |
| JP | 2010170202 A | 8/2010 |
| JP | 2012084012 A | 4/2012 |
| JP | 2013120556 A | 6/2013 |
| JP | 2015184944 A | 10/2015 |
| JP | 2015219681 A | 12/2015 |
| KR | 20030062043 A | 7/2003 |
| KR | 20080096053 A | 10/2008 |
| KR | 20120044484 A | 5/2012 |

OTHER PUBLICATIONS

First Office Action in JP Patent Application No. 2019166758 dated Oct. 20, 2020.
First Office Action issued in KR10-2019-0115268 dated Sep. 2, 2020.
First Office Action issued in CN Patent Application No. 201811245356.6 dated Aug. 4, 2020.
First Office Action in KR Patent Application No. 10-2021-0081937 dated Sep. 15, 2021.
Notice of Allowance in CN Patent Application No. 201811245356.6 dated Jun. 17, 2021.

* cited by examiner

METHOD, APPARATUS, AND DEVICE FOR IDENTIFYING HUMAN BODY AND COMPUTER READABLE STORAGE MEDIUM

CROSS-REFERENCE TO RELATED APPLICATIONS

This application claims priority to Chinese Patent Application No. 201811245356.6, filed on Oct. 24, 2018, which is hereby incorporated by reference in its entirety.

TECHNICAL FIELD

The present disclosure relates to image processing technologies, and in particular, to a method, a apparatus, and a device for identifying human body, and a computer readable storage medium.

BACKGROUND

At present, it is required to capture motion information of a human body in many application scenarios, such as in augmented reality (AR), virtual reality (VR), a security system, and some applications (APPs), all of which need to position limbs of the human to capture human body information.

In general, there is a wide range of motion for the human body, the human body can move left and right, and can move back and forth. However, since an angle of view of an image sensor such as a camera of a mobile phone, is wide-angle, a change in the distance of the subject to be photographed causes a significant change in a proportion of the human body in the picture. Taking a capturing APP for video special effects as an example, when a user makes dance movements that moves forward and backward, the proportion of an image occupied by the human body has a great change. This puts higher requirements on a method for limbs positioning, which is required to be at least compatible with human bodies with different sizes in the image.

The solution to the technical problem in the prior art is to directly increase resolution of images of an input model to identify human body information in the images, but in this way, it leads to an increment of multiplied calculation amount in the model. Therefore, an accurate and rapid positioning of the human body is a technical problem that needs to be solved urgently by those skilled in the art.

SUMMARY

The present disclosure provides a method, a apparatus, and a device for identifying human body, and a computer readable storage medium to solve the problem that a human body cannot be accurately and quickly positioned in the prior art.

A first aspect of the present disclosure provides a method for identifying human body, including:
  acquiring a first original picture captured;
  adjusting a resolution according to the first original picture acquired to obtain a target picture;
  processing the target picture based on a preset model for human body feature point detection model for human body feature point detection to determine whether the target picture includes human body information;
  if the target picture includes the human body information, determining human body area information in the original picture according to the human body information and inputting the human body area information into a filter, enabling that the filter determines target human body area information according to the human body area information;
  acquiring a next original picture captured; and
  determining a possible human body area in the next original picture according to the target human body area information, and performing the step of adjusting the resolution according to the possible human body area.

Another aspect of the present disclosure provides an apparatus for identifying human body, including:
  an acquiring module, configured to acquire a first original picture captured;
  an adjusting module, configured to adjust a resolution according to the first original picture acquired to obtain a target picture;
  a processing module, configured to process the target picture based on a preset model for human body feature point detection model for human body feature point detection to determine whether the target picture includes human body information;
  a first determining module, if the target picture includes the human body information, configured to determine human body area information in the original picture according to the human body information and to input the human body area information into a filter module, enabling that the filter module determines target human body area information according to the human body area information;
  the acquiring module is further configured to acquire a next original picture captured; and
  a second determining module, configured to determine a possible human body area in the next original picture according to the target human body area information, and the adjusting module is further configured to perform the step of adjusting the resolution according to the possible human body area.

Yet another aspect of the present disclosure provides a device for identifying human body, including:
  a memory
  a processor; and
  a computer program;
  where the computer program is stored in the memory and is configured to be executed by the processor to implement the method for identifying human body according to the first aspect described above.

A still further aspect of the present disclosure provides a computer readable storage medium, where the computer readable storage medium has a computer program stored thereon, and the computer program is executed by a processor to execute the method for identifying human body according to the first aspect described above.

Technical effects of the method, the apparatus, and the device for identifying human body and the computer readable storage medium provided by the present disclosure are:

The present disclosure provides a method, an apparatus, and a device for identifying human body, and a computer readable storage medium. The method includes: acquiring a first original picture captured; adjusting a resolution according to the picture acquired to obtain a target picture; processing the target picture based on a preset model for human body feature point detection model for human body feature point detection to determine whether the target picture includes human body information; if the target picture includes the human body information, determining human body area information in the original picture according to the human body information and inputting the human body area information into a filter, enabling the filter to determine target human body area information according to the human body area information; acquiring a next original picture captured; and determining a possible human body area in the next original picture according to the target human body area information, and performing the step of adjusting the resolution according to the possible human body area. According to the method, the apparatus, the device and the computer readable storage medium provided by the present disclosure, since an resolution of an picture input to the preset model for human body feature point detection model for human body feature point detection is fixed, there is no need to increase the complexity degree of data input to the model, meanwhile, the original picture can be processed according to an association relationship of human body areas changing over time in the picture, such that a possible human body area that may have a human body can be identified, and then a processing on the possible human body area is performed, in this way, data of a picture that needs to be processed can be greatly reduced.

DESCRIPTION OF EMBODIMENTS

Technology for identifying human body, applied in many application scenarios, determines a position of a human body mainly by identifying limbs features. It is necessary to find limbs feature points in an original picture of each frame and determine the position of the human body, especially when determining the position of the human body in a video. However, the human body in the video may move back and forth, and this results in a significant change in a proportion of the human body in the picture, which in turn causes a single identification in the prior art to fail to accurately identify the human body in the original picture.

According to technical solutions provided by embodiments of the present disclosure, continuous pictures in a video can be combined to determine a possible area where the human body may be positioned in a picture of a next frame, and then the human body can be identified in the possible area, which can reduce the size of the picture need to be identified, reduce the amount of computation, and can also accurately identify the human body.

Figure 1:
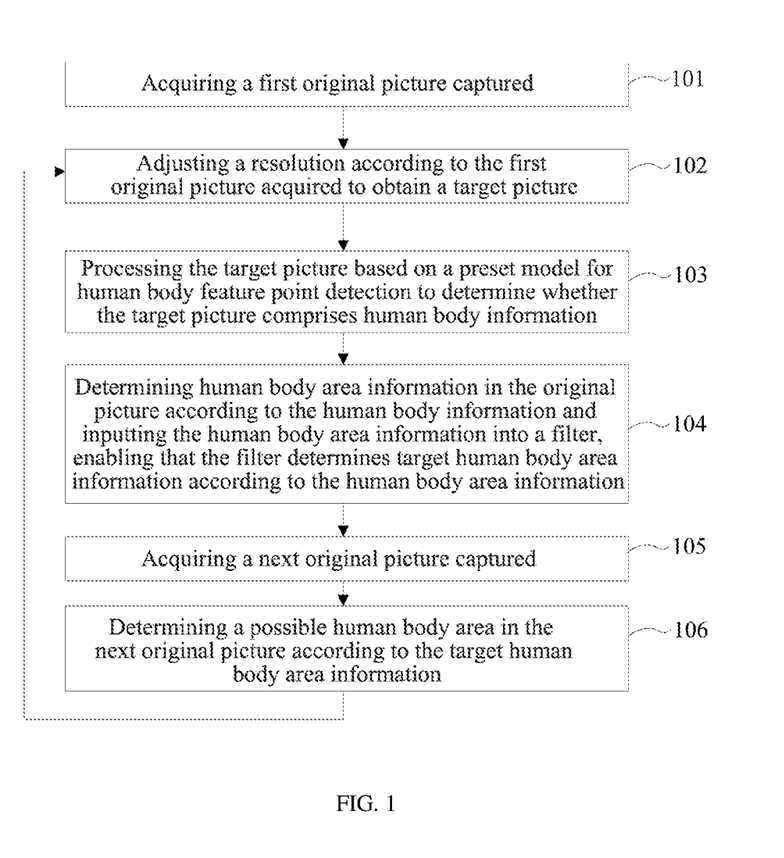
FIG. 1 is a flowchart illustrating a method for identifying human body according to an exemplary embodiment of the present disclosure.

FIG. 1 is a flow chart illustrating a method for identifying human body according to an exemplary embodiment of the present disclosure.

As shown in FIG. 1, the method for identifying human body provided in this embodiment includes:

Step 101: acquiring a first original picture captured.

The method provided in this embodiment may be encapsulated into a software to be installed in a device, which may be a smart terminal, a computer, a tablet computer, or the like. The device may have a capturing function or not. If the device has a capturing function, it may also have a storage function for storing a captured video and being able to read the video stored by itself, such as a smartphone. If the device does not have a capturing function, it may be connected to another device with a storage function to acquire a captured video from another device, such as a computer that can be connected to a storage device.

Specifically, the method provided in this embodiment may be used to process a video that has already been captured. For example, pictures in a video that has already been captured may be read frame by frame, and a processing is performed on each frame of picture. The method provided by this embodiment can also process a video being captured. At this time, the video being captured can be read frame by frame, and each frame of picture is processed until all the captured pictures are processed.

In addition, the method provided in this embodiment can also process multiple pictures captured continuously, where the captured pictures can be read one by one according to the capturing order, and a processing is performed on each read picture. For the sake of convenience, the embodiment will be described in detail by taking a video as an example.

Further, a picture of a first frame in the captured video may be acquired as a first original picture. When the first frame picture in the video is acquired, an area where the human body may be positioned in the picture cannot be determined at this time, and therefore, the original picture is processed, and the position of the human body is determined therein.

Step 102: adjusting a resolution according to the picture acquired to obtain a target picture.

In actual applications, a resolution of a picture acquired by a capturing device may be 1280×720, 1920×1080, etc. At this time, the original picture may be compressed, so that its resolution matches a specified resolution of a preset model for human body feature point detection model for human body feature point detection.

In general, the lower the resolution of a picture input to the model, the smaller the amount of computation for the model. For example, if a Deep-Learning model with a high input resolution is used for human body feature point detection, feature points of limbs can be found directly on a high-resolution picture by a single model. Due to a characteristic of a convolutional neural network, the amount of computation is directly proportional to an input resolution. If the resolution is increased from a resolution of 160×160 to a resolution of 320×320, the amount of computation will be directly increased by four times, and the time consumed is extended by four times. Therefore, it is a better situation that the resolution of the input picture just happens to enable the model to complete the computation and perform the identification, in this way, a desired output result can be obtained without increasing the amount of computation. Therefore, according to the method provided in this embodiment, a processed target picture is input into the preset model for human body feature point detection model for human body feature point detection, thereby avoiding the problem that the amount of computation is too large.

If the resolution specified by the preset model for human body feature point detection cannot be obtained through the compression performed on the picture directly, the picture may also be padded. For example, the resolution of the first original picture is 1280×720, and the target resolution for adjustment is 320×320, then the first original picture may be first compressed to 320×180, and then a padding is performed in the picture to make the resolution of the picture to be 320×320. Both the top and the bottom of the picture may be respectively padded with a black area with a height of 70 and a width of 320.

When the performing of the method get started, the target picture can be obtained according to the first original picture acquired. When the step 102 is performed again during the performing of the method, it is possible to determine the possible human body area based on another original picture, and then obtain a target picture according to the possible human body area.

Step 103: processing the target picture based on a preset model for human body feature point detection model for human body feature point detection to determine whether the target picture includes human body information.

The adjusted target picture may be input to the preset model for human body feature point detection model for human body feature point detection, which outputs human body information. If the original picture does not include the human body, the human body information will not be included in the target picture. At this time, the model may output a null message. If the target picture includes human body information, the human body information in the target picture, such as a specific contour of the human body, a relative position of the human body in the target picture, and the like, may be determined.

The model for human body feature point detection may be a model existing in the prior art, such as a snake method, an active shape model (ASM), an active appearance model (AAM), and the like. Based on these models, it is possible to identify whether or not the target picture has human body information.

Specifically, the preset model for human body feature point detection model for human body feature point detection may be used to identify feature points of limbs in the target picture, thereby identifying whether the target picture includes human body information.

If the human body information is included, step 104 will be performed.

Step 104: determining human body area information in the original picture according to the human body information and inputting the human body area information into a filter, enabling that the filter determines target human body area information according to the human body area information.

Further, since the target picture is determined by the first original picture, a position of the identified human body in the target picture may be determined first, and then the body area information is determined based on the position in the first original picture. For example, if the human body is at the center of the target picture, the human body should also be in the center area in the first original picture. If the target picture includes a padded area, a position of the human body relative to the center in the target picture is first determined, and the human body area information is determined in the first original picture according to the relative position.

In actual applications, the human body area information may also be input into the filter, so that the filter determines the target human body area information according to the human body area information. If the human body area information is determined in the first original picture, there is no human body area information obtained by the picture in the filter. At this time, the determined target human body area information may be the same as the input human body area information.

If the human body area information is determined in another subsequent frame picture, the filter may adjust the input human body area information according to the target human body area information of continuous preset pictures prior to the frame picture, so that the target human body area information can be determined according to an association relationship among the continuous multiple frame pictures. For video or continuous capturing pictures, the human body area information changing with time has a certain relationship, for example, similar regions and etc., so that a new human body area information acquired and historical human body area information can be combined and filtered. The target human body area information acquired includes additional information in the time domain, and when the human body information is acquired from the original picture based on the target human body area information, a jitter can be reduced.

The filter may be a Kalman filter or another smoothing filter to reduce the jitter generated during the identification process.

Step 105: acquiring a next original picture captured.

In actual applications, after processing the first picture in the video or the continuously captured pictures, a next original picture can be read. For example, in the video, the next frame of picture can be acquired as the next original picture.

Step 106: determining a possible human body area in the next original picture according to the target human body area information.

And the step of adjusting the resolution is performed according to the possible human body area.

If the target human body area information is determined in the first original picture, the possible area of the human body in the next picture may be predicted according to the target human body area information.

Specifically, if the target human body area information is exactly the region information of the area where the human body is positioned, that is, the target human body area can just frame the human body, the target human body area can be enlarged to predict that the human body may be in the enlarged area in the next picture. For the same video, a picture size of each frame can be considered to be the same. Therefore, a possible area of the human body in the next picture can be predicted according to the area of the human body in the previous picture.

Further, a screenshot may be performed on a next original picture captured according to the predicted possible area of the human body to obtain a picture where the human body is possibly included, and then a picture corresponding to the possible human body area is acquired, and then the step of adjusting the resolution in step 102 is performed based on the picture.

In actual applications, if a screenshot taken from the original picture is a picture that possibly includes the human body, the resolution of this picture may be smaller than the specified resolution of the preset model for human body feature point detection. At this time, the picture that possibly includes the human body may be stretched and padded so that its resolution matches the requirement of data input to the above model.

Correspondingly, a target picture can be acquired again according to the screenshot, and the target picture acquired this time is processed based on the preset model for human body feature point detection to determine whether the target picture includes human body information. If the human body information is included, human body area information is determined in the original picture acquired this time according to the human body information, and the human body area information is input into a filter, so that the filter determines target human body area information according to the human body area information.

After multiple times of cycling processing, features of a human body of each frame in the video may be identified without changing the input resolution of the model, and possible human body area information in a next frame is predicted according to target human body area information in a previous picture. An area where a human body is positioned may be determined taking into account of position relationship of the human body among pictures, a jitter can be reduced, so that an area of a human body can be determined more accurately. All frame pictures in the video may be processed. The method ends until the last frame picture is processed.

The method provided by this embodiment is used to identify a human body in a picture, and the method is performed by a device provided with the method provided by the embodiment, and the device is usually implemented in hardware and/or software.

The human body identification method according to the embodiment includes: acquiring a first original picture captured; adjusting a resolution according to the acquired picture to obtain a target picture; processing the target picture based on a preset model for human body feature point detection to determine whether the target picture includes human body information; if the target picture includes the human body information, determining human body area information in the original picture according to the human body information and inputting the human body area information into a filter, enabling that the filter determines target human body area information according to the human body area information; acquiring a next original picture captured; and determining a possible human body area in the next original picture according to the target human body area information, and performing the step of adjusting the resolution according to the possible human body area. According to the method, the apparatus, the device and the computer readable storage medium provided by the present disclosure, the resolution of the picture input to the preset model for human body feature point detection is fixed, and there is no need to increase the complexity degree of data input to the model, meanwhile, the original picture can be processed according to an association relationship of a human body area changing over time in the pictures, such that a possible human body area that may have human body can be identified, and then a processing on the possible human body area is performed, in this way, data of pictures that needs to be processed can be greatly reduced.

Figure 2:
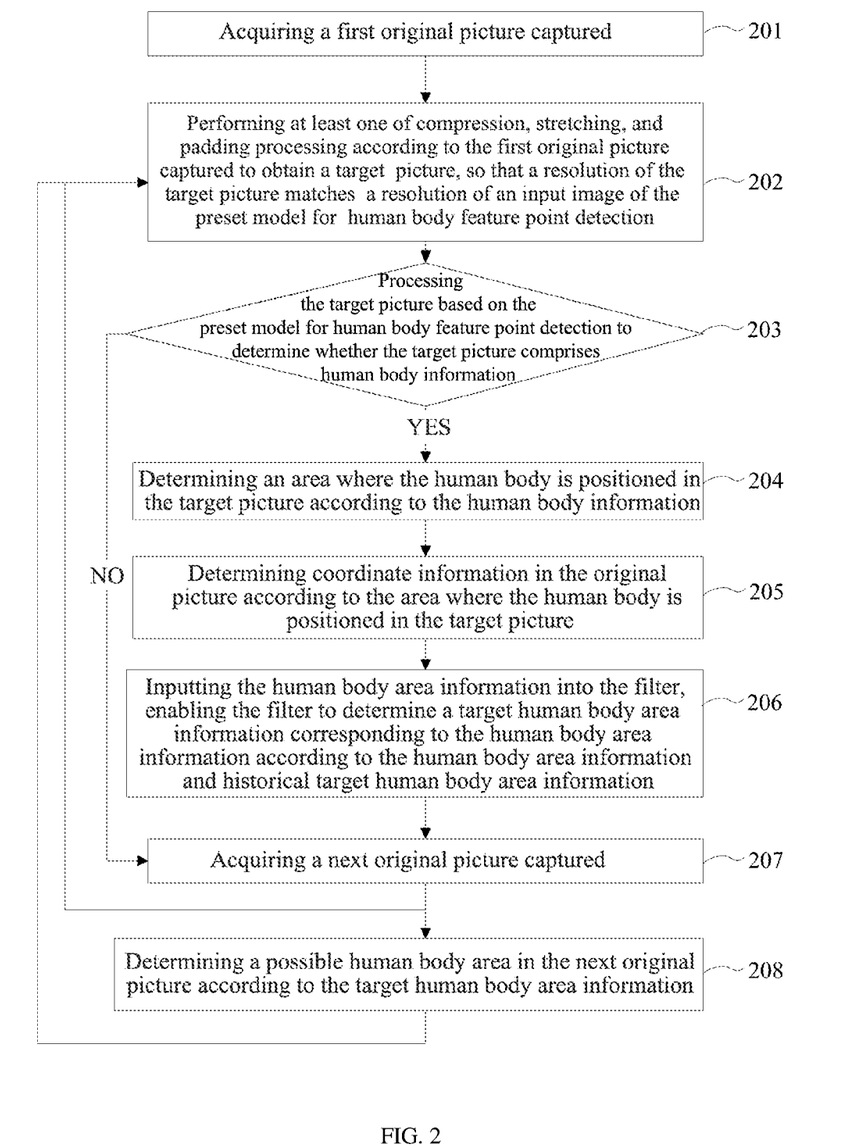
FIG. 2 is a flowchart illustrating a method for identifying human body according to another exemplary embodiment of the present disclosure.

FIG. 2 is a flowchart illustrating a method for identifying human body according to another exemplary embodiment of the present disclosure.

As shown in FIG. 2, the human body identification method provided in this embodiment includes:

Step 201: acquiring a first original picture captured.

Specific principle and implementation manner of step 201 are similar to that of step 101, where details are not described herein again.

Step 202: performing compression, and/or stretching, and/or padding processing according to the picture acquired to obtain a target picture, so that a resolution of the target picture matches a resolution of a picture input to the preset model for human body feature point detection.

In the method provided by the embodiment, a manner for performing resolution processing on the picture may include compression, stretching, padding, etc., using which manner to process a picture is determined according to a resolution of the picture, and the resolution of the processed target picture matches a resolution of a picture input to a preset model for human body feature point detection. For example, the resolution of the picture input to the preset model for human body feature point detection is 320×320, and then the target picture resolution obtained is also 320×320.

Specifically, if a resolution of a picture being processed is relatively large, for example, to process the first original picture, an operation of compression may be selected. If a resolution of a picture to be processed is relatively small, for example, to screenshot a possible human body area in the original picture, then an operation of stretching may be performed on the picture.

Further, during an initial execution of the method, it is impossible to determine a possible area of the human body, and therefore, a target picture is determined based on an acquired first original picture. In the subsequent process of cycling execution, it is possible to detect human body information, and determine a possible human body area in the original picture based on the human body information, and take a screenshot of the possible human body area. At this time, a picture corresponding to the possible human body area may be acquired and processed to obtain a target picture. In addition, if human body information is not detected in a previous original picture, the process for processing a next original picture is the same as the process for processing the first original picture.

Step 203: processing the target picture based on a preset model for human body feature point detection to determine whether the target picture comprises human body information.

The specific principle and implementation manner of step 203 are similar to that of step 103, where details are not described herein again.

If the target picture includes human body information, then go to step 204, otherwise, go to step 206.

Step 204: determining an area where the human body is positioned in the target picture according to the human body information.

After the human body information is detected by the preset model for human body feature point detection, an area where the human body is positioned in the target picture may be determined according to the determined human body information. If the human body information includes position information, the area where the human body is positioned may be directly determined according to the position information; and if the position information is not included in the body information, an area including the human body information may be detected in the target picture, and this area is used as the area where the human body is positioned.

Step 205: determining coordinate information in the original picture according to the area where the human body is positioned in the target picture.

In the method provided in this embodiment, the human body area information may be represented by coordinate information.

If the target picture is obtained based on the original picture, the coordinate information may be determined in the original picture according to the relative position of the body information in the target picture. A proportional compression may be performed on the original picture to obtain the target picture. For example, the first original picture is compressed to obtain the target picture. At this time, a corresponding area may be found in the first original picture according to the relative position of the target picture. After determining the area where the human body is positioned in the original picture, the coordinate information of the area may be obtained.

If the target picture is obtained based on the possible human body area, the position where the human body is positioned may be determined first in the possible human body area, and the coordinate information may be determined in the original picture to which the possible human body area belongs. Similarly, a relative position of the human body area may be determined in the target picture, and the area where the human body is positioned may be found in the possible human body area based on the relative position. Since the possible human body area may be part of the original picture, a position of the possible human body area in the original picture may be determined, and the area where the human body is positioned in the original picture is determined according to the relative position of the possible human body area and the position of the possible human body area in the original picture, and then the coordinate information of the area is obtained.

Since human body area information determined currently may affect a determining result of the human body area in a next frame picture, and an area where the human body is positioned in the picture may change during a motion of the human body, step 205 may further include:

determining an original human body area in the original picture according to the area where the human body is positioned in the target picture;

enlarging the original human body area by a preset multiple times to obtain an enlarged area; and determining a horizontal coordinate and a vertical coordinate of an upper left corner of the enlarged area, and a horizontal coordinate and a vertical coordinate of a lower right corner of the enlarged area as the coordinate information; or determining a horizontal coordinate and a vertical coordinate of an upper left corner of the enlarged area, and a horizontal coordinate and a vertical coordinate of a center point of the enlarged area as the coordinate information, or determining a horizontal coordinate and a vertical coordinate of a lower right corner of the enlarged area, and a horizontal coordinate and a vertical coordinate of a center point of the enlarged area as the coordinate information.

The determining an original human body area in the original picture according to the area where the human body is positioned in the target picture is similar to the above description, an original human body area in an original picture may be determined according to a relative position of an area where the human body is positioned in the target picture.

In the original picture, the original human body area may be enlarged, for example, may be enlarged to 1.2 times of the original size, which specifically may be expanded by 1.2 times from the center of the original human body area, thereby avoiding a situation that part of limbs being left out for identification due to a motion of the human body when a human body area in a picture of a next frame is identified according to the human body area in a picture of a current frame.

Correspondingly, the coordinate information may be determined according to the enlarged area, and specifically, a horizontal coordinate and a vertical coordinate of an upper left corner of the enlarged area, and a horizontal coordinate and a vertical coordinate of a lower right corner of the enlarged area may be determined as the coordinate information; or a horizontal coordinate and a vertical coordinate of an upper left corner of the enlarged area, and a horizontal coordinate and a vertical coordinate of a center point of the enlarged area may be determined as the coordinate information, or a horizontal coordinate and a vertical coordinate of a lower right corner of the enlarged area, and a horizontal coordinate and a vertical coordinate of a center point of the enlarged area may be determined as the coordinate information.

Optionally, the area where the human body is positioned determined in the target picture is a rectangular area. Correspondingly, an original human body area determined in the original picture according to the area where the human body is positioned is also a rectangular area, and an enlarged area obtained by enlarging the original human body area determined is still a rectangular area. This rectangular refers to a rectangle area or a square area.

Step 206: inputting the human body area information into the filter, enabling that the filter determines a target human body area information corresponding to the human body area information according to the human body area information and historical target human body area information.

The historical target human body area information is target human body area information previously determined according to the original picture.

Specifically, if, at the beginning of the method, the human body area information is determined according to the first original picture and the human body area information is input to the filter, the filter determines the target body area information according to the body area information.

Further, if, during the performing of the method, the step is performed again after a cycle, at this time, the target human body area information has been determined previously according to a picture of another frame, that is, the historical target human body area information is already available, so the filter may determine the target human body area information corresponding to human body area information currently input according to the human body area information currently input and the historical human body area information.

In the method provided by the embodiment, the filter filters the current latest human body area information together with target human body area information detected in a plurality of continuous pictures in the past, for example, the current human body area information and the target human body area information obtained in the pictures of a plurality of previous continuous frames. As a result, the body area information may be adjusted according to an association between a plurality of continuous pictures in the time domain, so as to obtain additional information from the time domain, and as a result, the target body area information obtained is smoother, and a jitter can be reduced. The filter may be a Kalman filter or a simple smoothing filter.

Step 207: acquiring a next original picture captured.

If the first original picture is acquired at a previous time, a second original picture may be acquired when this step is performed; if the N-th original picture is acquired at a previous time, then the (N+1)-th original picture may be acquired when this step is performed.

The specific principle and implementation manner of step 207 are similar to that of step 105, where details are not described herein again.

Step 208: determining a possible human body area in the next original picture according to the target human body area information.

Where, if it is the first original picture acquired at a previous time, and the target human body area information is determined in the first original picture, the possible human body area is determined in the original picture acquired in step 207 according to the target human body area information.

Specifically, if it is the N-th original picture acquired at a previous time, and the target human body area information is determined in the N-th original picture, the possible human body area is determined in the original picture acquired in step 207 according to the target human body area information.

Further, the step of adjusting the resolution in step 202 is performed based on the possible human body area again. A screenshot may be performed on the original picture captured according to the possible human body area, the screenshot is obtained again, and step 202 is performed.

Optionally, if it is determined in step 203 that the original picture does not include the human body information, the original picture at this time may be the first original picture captured, or may be the N-th original picture, if the human body information is not included therein, the step of acquiring a next original picture captured in step 207 is performed to obtain the next original picture captured, and the step of adjusting the resolution to obtain a target picture in step 202 is performed according to the next original picture acquired.

In the method provided in this embodiment, if it is determined in step 203 that the original picture includes human body information, after step 203, steps 204-208 may be performed. If it is determined in step 203 that the original picture does not include human body information, the step of performing compression and/or stretching and/or padding processing to obtain a target picture in steps 202 are performed.

In actual applications, the original picture may be acquired frame by frame. First, a resolution processing is performed on a current original picture to obtain a target picture, and then whether the target human body information is included in the target picture is identified based on a preset model for a human body feature point detection. If the target human body information is included, information about target human body area where the human body is positioned is determined. If the target human body information is not included, a next frame of original picture is acquired.

When processing a currently original picture acquired, if a picture of a previous frame includes human body information, that is, target human body area information of the picture of the previous frame is determined, then a possible human body area may be determined in the current original picture acquired according to the target human body area information of the picture of the previous frame, a resolution processing is performed according to the possible area to obtain a target picture. If the human body information is not included in the picture of the previous frame, there is no target human body area information in the picture of the previous frame, then a resolution processing may be performed directly on the current original picture acquired to obtain the target picture.

Figure 3:
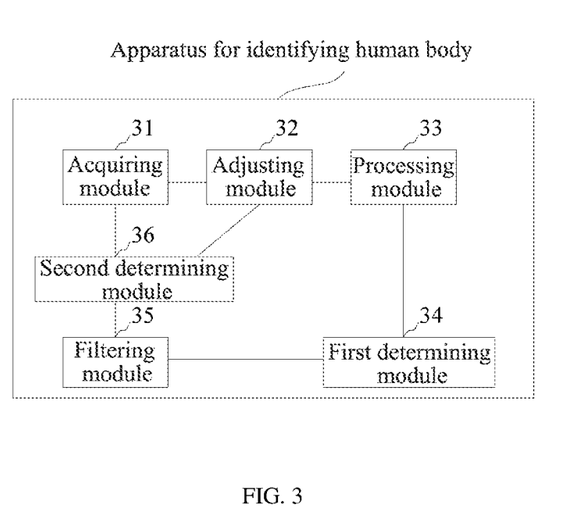
FIG. 3 is a structural diagram illustrating an apparatus for identifying human body according to an exemplary embodiment of the present disclosure.

FIG. 3 is a structural diagram illustrating an apparatus for identifying human body according to an exemplary embodiment of the present disclosure.

As shown in FIG. 3, the apparatus for identifying human body provided in this embodiment includes:

an acquiring module 31, configured to acquire a first original picture captured;
an adjusting module 32, configured to adjust a resolution according to the first original picture acquired to obtain a target picture;
a processing module 33, configured to process the target picture based on a preset model for human body feature point detection to determine whether the target picture comprises human body information;
a first determining module 34, if the target picture comprises the human body information, configured to determine human body area information in the original picture according to the human body information and to input the human body area information into a filter module 35, enabling that the filter module 35 determines target human body area information according to the human body area information;
the acquiring module 31 is further configured to acquire a next original picture captured; and
a second determining module 36, configured to determine a possible human body area in the next original picture according to the target human body area information, and the adjusting module 32 is further configured to perform the step of adjusting the resolution according to the possible human body area.

The present embodiment provides an apparatus for identifying human body, including: an acquiring module, configured to acquire a first original picture captured; an adjusting module, configured to adjust a resolution according to the original picture acquired to obtain a target picture; a processing module, configured to process the target picture based on a preset model for human body feature point detection to determine whether the target picture includes human body information; a first determining module, if the target picture includes the human body information, configured to determine human body area information in the original picture according to the human body information and to input the human body area information into a filter module, enabling that the filter module determines target human body area information according to the human body area information; the acquiring module is further configured to acquire a next original picture captured; and a second determining module, configured to determine a possible human body area in the next original picture according to the target human body area information, and the adjusting module is further configured to perform the step of adjusting the resolution according to the possible human body area. According to the apparatus provided in the embodiment, since an resolution of an picture input to the preset model for human body feature point detection model for human body feature point detection is fixed, there is no need to increase the complexity degree of data input to the model, meanwhile, the original picture can be processed according to an association relationship of human body areas changing over time in the picture, such that a possible human body area that may have a human body can be identified, and then a processing on the possible human body area is performed, in this way, data of a picture that needs to be processed can be greatly reduced.

The specific principles and implementation manners of the apparatus for identifying human body provided in this embodiment are similar to that of embodiments shown in FIG. 1, where details are not described herein again.

Figure 4:
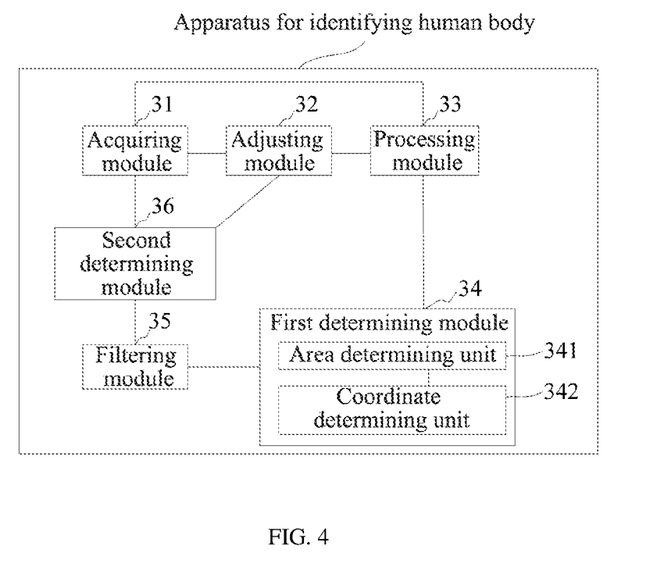
FIG. 4 is a structural diagram illustrating an apparatus for identifying human body according to another exemplary embodiment of the present disclosure.

FIG. 4 is a structural diagram illustrating an apparatus for identifying human body according to another exemplary embodiment of the present disclosure.

As shown in FIG. 4, on the basis of the foregoing embodiment, in this apparatus for identifying human body provided in this embodiment, the acquiring module 31 performs the step of acquiring the next original picture captured, and the adjusting module 32 performs the adjusting the resolution according to the next picture to obtain a target picture if the processing module 33 determines that the target picture does not includes the human body information.

The adjustment module 32 is specifically configured to:
perform compression, and/or stretching, and/or padding processing on a picture to obtain a target picture, so that a resolution of the target picture matches a resolution of an input image of the preset model for human body feature point detection.

The first determining module 34 includes:
an area determining unit 341, configured to determine an area where the human body is positioned in the target picture according to the human body information; and
a coordinate determining unit 342, configured to determine coordinate information in the original picture according to the area where the human body is positioned in the target picture.

The coordinate determining unit 342 is specifically configured to:
determine an original human body area in the original picture according to the area where the human body is positioned in the target picture;
enlarge the original human body area by a preset multiple times to obtain an enlarged area;
determine a horizontal coordinate and a vertical coordinate of an upper left corner of the enlarged area, and a horizontal coordinate and a vertical coordinate of a lower right corner of the enlarged area as the coordinate information; or determining a horizontal coordinate and a vertical coordinate of an upper left corner of the enlarged area, and a horizontal coordinate and a vertical coordinate of a center point of the enlarged area as the coordinate information, or determining a horizontal coordinate and a vertical coordinate of a lower right corner of the enlarged area, and a horizontal coordinate and a vertical coordinate of a center point of the enlarged area as the coordinate information.

The area where the human body is positioned is a rectangular area.

The filtering module 35 is specifically configured to:
determine the target human body area information corresponding to the human body area information according to the human body area information and historical target human body area information, wherein the historical target human body area information is an target human body area information previously determined according to an original picture.

The specific principles and implementations of the apparatus for identifying human body provided in this embodiment are similar to that of the embodiment shown in FIG. 2, where details are not described herein again.

Figure 5:
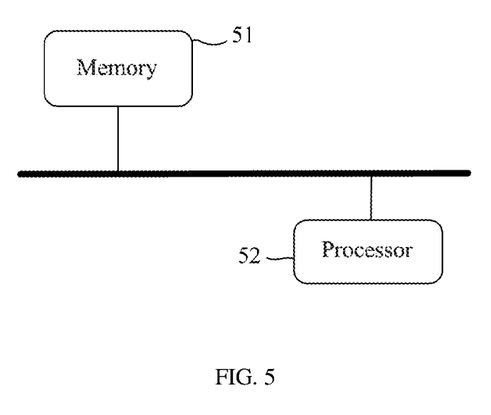
FIG. 5 is a structural diagram illustrating a device for identifying human body according to an exemplary embodiment of the present disclosure.

FIG. 5 is a structural diagram illustrating a device for identifying human body according to an exemplary embodiment of the present disclosure.

As shown in FIG. 5, the device for identifying human body provided in this embodiment includes:
a memory 51;
a processor 52; and
a computer program;
where the computer program is stored in the memory 51 and is configured to be executed by the processor 52 to implement any of the methods for identifying human body described above.

The embodiment further provides a computer readable storage medium, where the computer readable storage medium has a computer program stored thereon.

The computer program is executed by a processor to implement any of the methods for identifying human body described above.

Those of ordinary skill in the art should understand that all or part of the steps in various method embodiments described above may be accomplished by a hardware associated with program instructions. The aforementioned program can be stored in a computer readable storage medium. The program, when being executed, implements steps including the steps of the foregoing method embodiments; and the foregoing storage medium includes various media that can store program codes, such as a read only memory (ROM), a random accessed memory (RAM), a magnetic disk, or an optical disk.

At last, it should be noted that the above embodiments are merely illustrative of the technical solutions of the present disclosure, and are not intended to limit thereof. Although the present disclosure has been described in detail with reference to the foregoing embodiments, those skilled in the art will understand that the technical solutions described in the foregoing embodiments may be modified, or that some or all of the technical features may be equivalently substituted; these modifications or substitutions do not deviate the nature of the corresponding technical solution from the scope of the technical solutions of various embodiments according to the present disclosure.

What is claimed is:
1. A method for identifying human body, comprising:
acquiring a first original picture captured;
adjusting a resolution of the first original picture acquired to obtain a target picture, wherein a resolution of the target picture satisfies a resolution requirement of a preset model for human body feature point detection;
processing the target picture based on the preset model to determine whether the target picture comprises human body information;
if the target picture comprises the human body information, determining human body area information in the original picture according to the human body information and inputting the human body area information into a filter, enabling that the filter determines target human body area information according to the human body area information;
acquiring a next original picture captured, wherein the first original picture and the next original picture are two consecutive frames from a video;
determining a predicted area that comprises a human body in the next original picture according to the target human body area information, obtaining a processed image that is part of the next original picture and comprises the predicted area, and adjusting a resolution of the processed image to obtain a next target picture that has a same size as that of the processed image, wherein a resolution of the next target picture is same as the resolution of the target picture, the target picture is obtained based on the first original picture and has a resolution lower than the resolution of the first original picture; and
inputting the next target picture into the preset model to obtain updated human body information;
wherein the filter determines target human body area information according to the human body area information, comprises:
the filter determines the target human body area information corresponding to the human body area information according to the human body area information and historical target human body area information, wherein the historical target human body area information is a target human body area information previously determined according to an original picture.

2. The method according to claim 1, wherein if the target picture does not comprise the human body information, performing the step of acquiring the next original picture captured, and adjusting a resolution according to the next picture to obtain a target picture.

3. The method according to claim 1, wherein the adjusting the resolution of the first original picture comprises:
performing at least one of compression, stretching, and padding processing on an original picture to obtain a target picture.

4. The method according to claim 1, wherein the determining human body area information in the original picture according to the human body information comprises:
determining an area where the human body is positioned in the target picture according to the human body information; and
determining coordinate information in the original picture according to the area where the human body is positioned in the target picture.

5. The method according to claim 4, wherein the determining coordinate information in the original picture according to the area where the human body is positioned in the target picture comprises:
determining an original human body area in the original picture according to the area where the human body is positioned in the target picture;
enlarging the original human body area by a preset multiple times to obtain an enlarged area; and
determining a horizontal coordinate and a vertical coordinate of an upper left corner of the enlarged area, and a horizontal coordinate and a vertical coordinate of a lower right corner of the enlarged area as the coordinate information; or determining a horizontal coordinate and a vertical coordinate of an upper left corner of the enlarged area, and a horizontal coordinate and a vertical coordinate of a center point of the enlarged area as the coordinate information, or determining a horizontal coordinate and a vertical coordinate of a lower right corner of the enlarged area, and a horizontal coordinate and a vertical coordinate of a center point of the enlarged area as the coordinate information.

6. The method according to claim 4, wherein the area where the human body is positioned is a rectangular area.

7. A device for identifying human body, comprising:
a memory;
a processor; and
a computer program;
wherein the computer program is stored in the memory and is configured to be executed by the processor to:
acquire a first original image and a second original image succeeding to the first original image from a video, wherein the first original image has a same size as the second original image;
obtain a processed first original image which has a first resolution by adjusting a resolution of the first original image;
input the processed first original image to a detecting model to obtain human body information;
determine human body area information according to the human body information; input the human body area information into a filter to obtain target human body area information;

determine a predicted area that comprises a human body in the second original image according to the target human body area information;
obtain a processed image that is part of the second original image and comprises the predicted area;
obtain a third image by adjusting a resolution of the processed image, wherein the third image has a same resolution as the processed first original image and has a same size as the processed image; and
input the third image to the detecting model to obtain updated human body information.

8. The device according to claim 7, wherein the adjusting a resolution of the first original image comprises performing at least one of compression, stretching, and padding processing on the first original image.

9. The device according to claim 7, wherein the computer program is further configured to be executed by the processor to:
determine an area where the human body is positioned in the processed first original image according to the human body information; and
determine coordinate information in the first original image according to the area where the human body is positioned in the processed first original image.

10. The device according to claim 9, wherein the computer program is further configured to be executed by the processor to:
determine an original human body area in the first original image according to the area where the human body is positioned in the processed first original image;
enlarge the original human body area by a preset multiple times to obtain an enlarged area; and
determine a horizontal coordinate and a vertical coordinate of an upper left corner of the enlarged area, and a horizontal coordinate and a vertical coordinate of a lower right corner of the enlarged area as the coordinate information; or determining a horizontal coordinate and a vertical coordinate of an upper left corner of the enlarged area, and a horizontal coordinate and a vertical coordinate of a center point of the enlarged area as the coordinate information, or determining a horizontal coordinate and a vertical coordinate of a lower right corner of the enlarged area, and a horizontal coordinate and a vertical coordinate of a center point of the enlarged area as the coordinate information.

11. The device according to claim 9, wherein the area where the human body is positioned is a rectangular area.

12. The device according to claim 7, wherein the target human body area information corresponding to the human body area information is determined by the filter according to the human body area information and historical target human body area information, wherein the historical target human body area information is an target human body area information previously determined and stored in the memory.

13. A non-transitory computer readable storage medium, wherein the computer readable storage medium has a computer program stored thereon, wherein the computer program is executed by a processor to:
acquire a first original image and a second original image succeeding to the first original image from a video, wherein the first original image has a same size as the second original image;
obtain a processed first original image which has a first resolution by adjusting a resolution of the first original image;

input the processed first original image to a detecting model to obtain human body information;

determine human body area information according to the human body information; input the human body area information into a filter to obtain target human body area information;

determine a predicted area that comprises a human body in the second original image according to the target human body area information;

obtain a processed image that is part of the second original image and comprises the predicted area;

obtain a third image by adjusting a resolution of the processed image, wherein the third image has a same resolution as the processed first original image and has a same size as the processed image; and input the third image to the detecting model to obtain updated human body information.

14. The non-transitory computer readable storage medium according to claim 13, wherein the adjusting a resolution of the first original image comprises performing at least one of compression, stretching, and padding processing on the first original image.

15. The non-transitory computer readable storage medium according to claim 13, wherein the computer program is executed by a processor to:

determine an area where the human body is positioned in the processed first original image according to the human body information; and determine coordinate information in the first original image according to the area where the human body is positioned in the processed first original image.

16. The non-transitory computer readable storage medium according to claim 15, wherein the computer program is executed by a processor to:

determine an original human body area in the first original image according to the area where the human body is positioned in the processed first original image;

enlarge the original human body area by a preset multiple times to obtain an enlarged area; and determine a horizontal coordinate and a vertical coordinate of an upper left corner of the enlarged area, and a horizontal coordinate and a vertical coordinate of a lower right corner of the enlarged area as the coordinate information; or determining a horizontal coordinate and a vertical coordinate of an upper left corner of the enlarged area, and a horizontal coordinate and a vertical coordinate of a center point of the enlarged area as the coordinate information, or determining a horizontal coordinate and a vertical coordinate of a lower right corner of the enlarged area, and a horizontal coordinate and a vertical coordinate of a center point of the enlarged area as the coordinate information.

17. The non-transitory computer readable storage medium according to claim 15, wherein the area where the human body is positioned is a rectangular area.

18. The non-transitory computer readable storage medium according to claim 13, wherein the target human body area information corresponding to the human body area information is determined by the filter according to the human body area information and historical target human body area information, wherein the historical target human body area information is a target human body area information previously determined and stored in the computer readable storage medium.

* * * * *